United States Patent [19]

Kraft et al.

[11] 4,270,906
[45] Jun. 2, 1981

[54] BELT TENSIONER CONSTRUCTION

[75] Inventors: Derald H. Kraft, Canton; Daniel M. Rinaldo, Akron, both of Ohio

[73] Assignee: Dyneer Corporation, Canton, Ohio

[21] Appl. No.: 90,883

[22] Filed: Nov. 5, 1979

[51] Int. Cl.³ .................... F16H 7/12; F16H 21/44
[52] U.S. Cl. .................... 474/135; 474/133; 474/101; 198/813; 74/99 A; 74/567
[58] Field of Search .............. 474/101, 112, 133, 134, 474/135, 136, 137, 138, 139; 74/99 A, 107, 567; 192/93 B, 108; 198/813, 814

[56] References Cited

U.S. PATENT DOCUMENTS

| | | | |
|---|---|---|---|
| 1,815,954 | 7/1931 | Opie | 474/138 |
| 1,914,908 | 6/1933 | Buckley | 474/134 X |
| 2,936,652 | 5/1960 | Gunzner | 74/567 |
| 3,365,968 | 1/1968 | Merriman | 474/135 |
| 3,608,658 | 9/1971 | Woodfill et al. | 74/99 A |
| 3,636,995 | 1/1972 | Newman | 474/135 X |
| 3,888,343 | 6/1975 | Snyder | 198/813 X |
| 4,013,163 | 3/1977 | Gaal | 198/814 X |
| 4,175,934 | 3/1979 | Sragal | 474/135 |

FOREIGN PATENT DOCUMENTS 550477 12/1922 France ...................... 474/135

Primary Examiner—C. J. Husar
Assistant Examiner—Philip W. Thor
Attorney, Agent, or Firm—Frease & Bishop

[57] ABSTRACT

A belt tensioner for an endless drive belt for vehicle accessories has a shaft which is mounted in a fixed position adjacent the belt. A lever is pivotally mounted on the shaft and has an idler pulley rotatably mounted on an extended end of the lever. The pulley is movable into tensioning engagement with the belt by rotation of the lever. A first cam plate is slidably mounted on the shaft and is engaged with a second cam plate which is attached to the lever for rotation with the lever. The cam plates each have a plurality of a series of camming surfaces which are mutually engageable with the opposite cam plate surfaces. A plurality of spring discs are telescopically mounted on the shaft and bias the first camming block into engagement with the second block applying a rotational force on the lever to move the pulley into tensioning engagement with the drive belt. A hub is adjustably mounted on the shaft and is in abutting engagement with the springs to adjust the amount of camming force exerted on the lever, and correspondingly, on the belt by the idler pulley.

20 Claims, 18 Drawing Figures

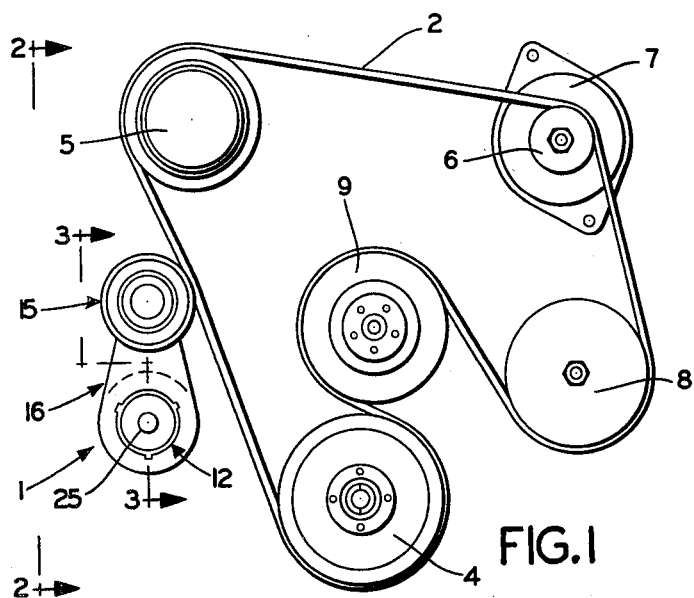
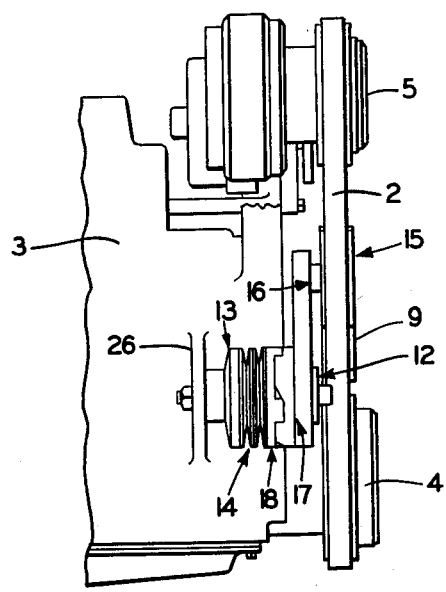
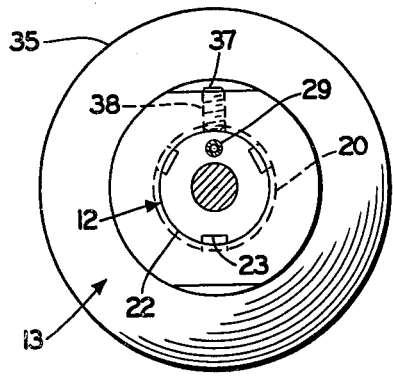
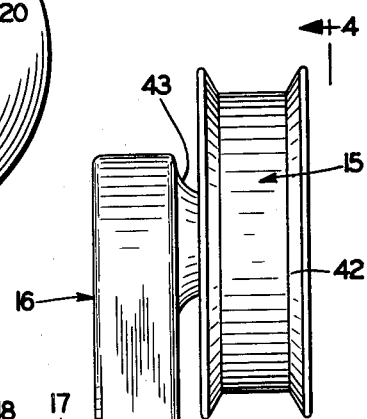
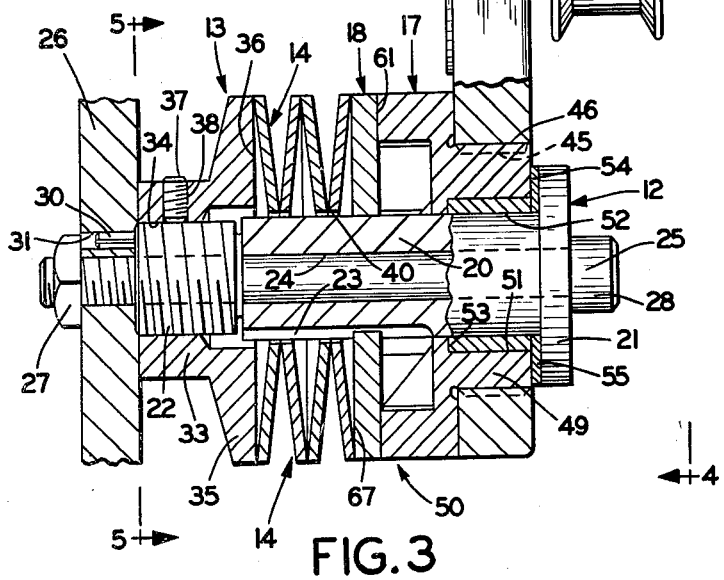
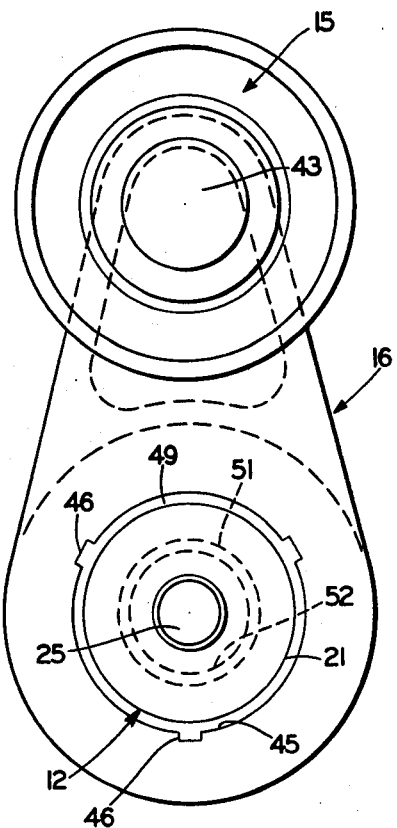

U.S. Patent Jun. 2, 1981 Sheet 2 of 3 4,270,906
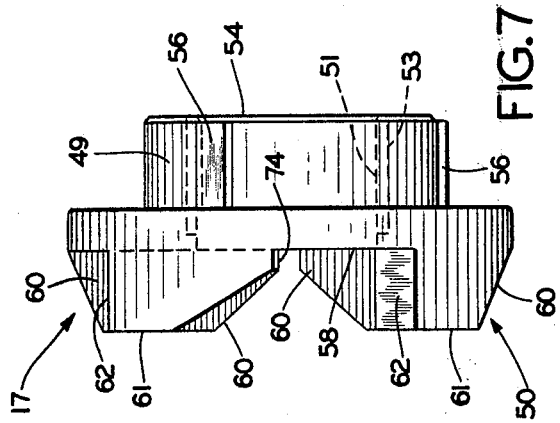
FIG.7
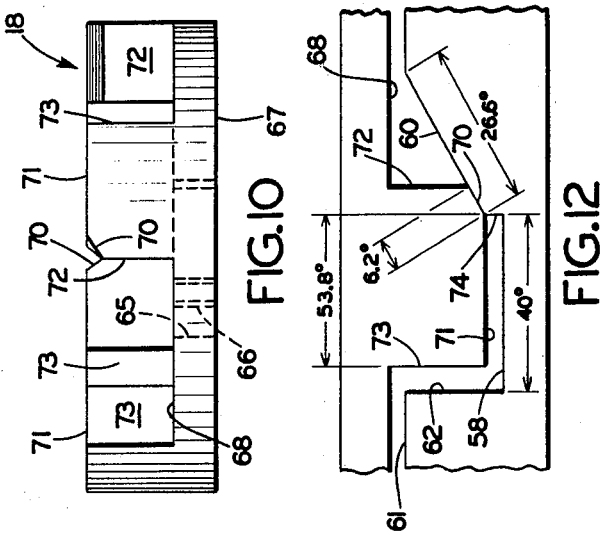
FIG.10
FIG.12
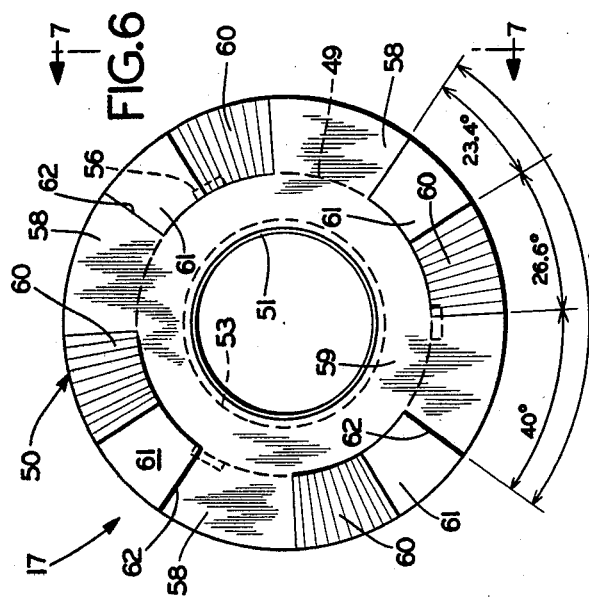
FIG.6
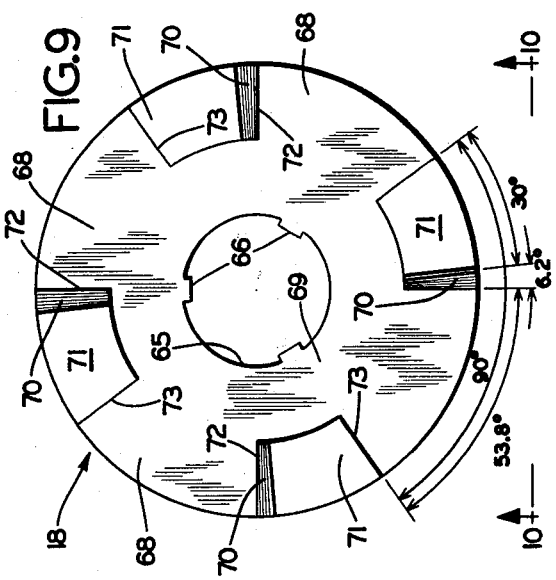
FIG.9
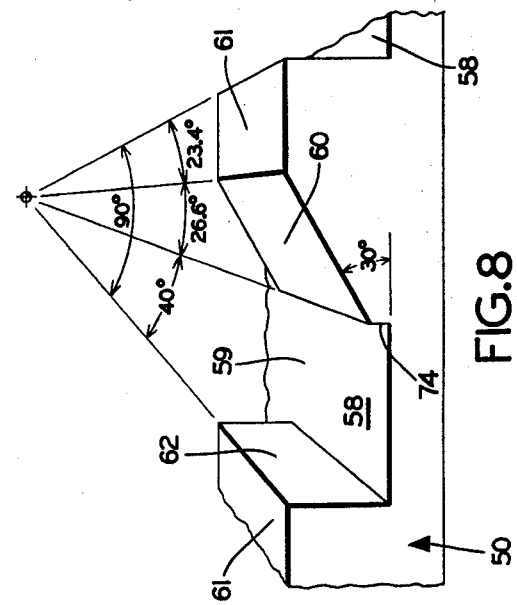
FIG.8
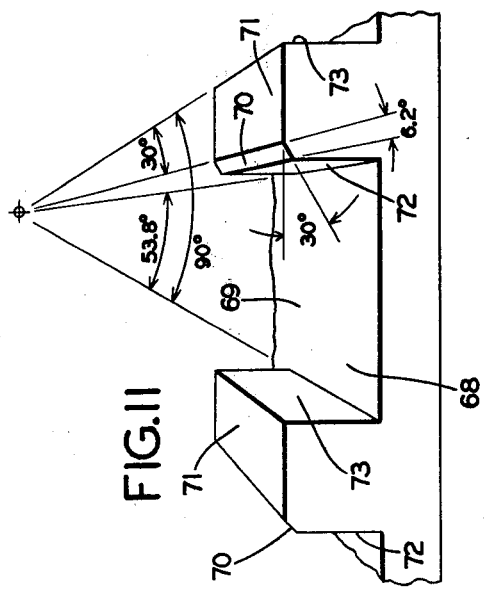
FIG.11

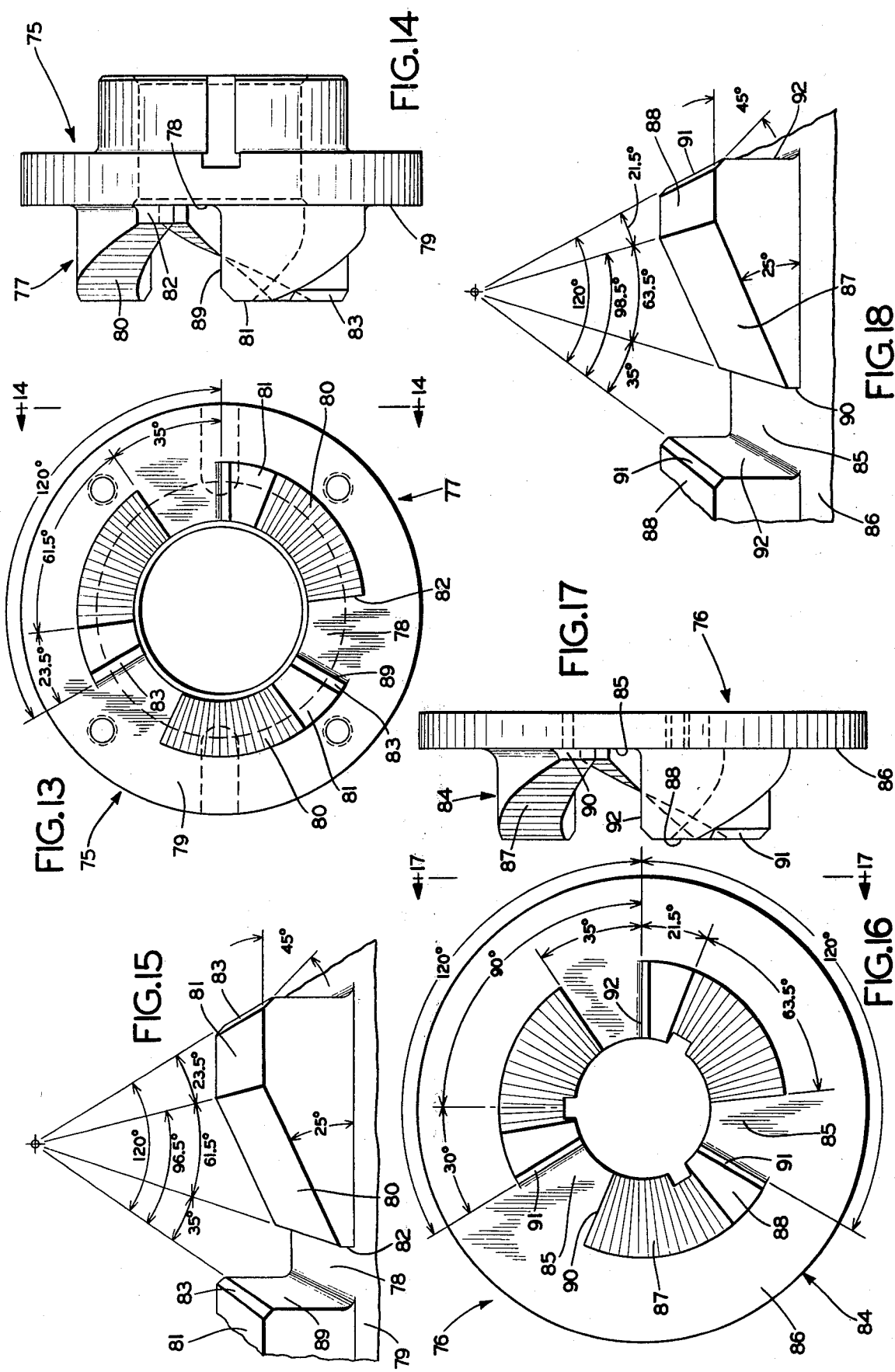

BELT TENSIONER CONSTRUCTION

BACKGROUND OF THE INVENTION

1. Field of the Invention

The invention relates to belt tensioning devices, and in particular to spring-biased, cam-actuated belt tensioning devices for use with the endless drive belts of the drive systems for vehicle accessories. More particularly, the invention relates to an extremely simple and inexpensive belt tensioner operable by a plurality of spring discs and a pair of camming plates, which maintains a nearly constant predetermined tensioning force on the endless drive belt regardless of whether the engine is on or off, and which provides an improved shock-absorbing damping action on the tensioner.

2. Description of the Prior Art

There is the trend today in the automobile industry to operate the various vehicle accessories, such as the power steering pump, oil and air pumps, air conditioning and alternator, by a single endless belt driven by a pulley connected to the engine crankshaft. This system is referred to as a "serpentine" drive belt system. To insure optimum operating efficiency for these various accessories it is necessary that the drive belt be maintained at a predetermined tension to assure efficient performance of the accessories as well as satisfactory service life for the belt. Due to the relatively greater length for the single drive belt which replaces the heretofore plurality of smaller belts, there is a greater tendency for the belt to stretch which will affect the operating characteristics of the driven accessories. Therefore, it is desirable that a belt tensioning device be used for these endless belts to provide reliable service over an extended period of time and to maintain a constant amount of tension thereon regardless of the amount of belt stretch.

Numerous devices have been proposed and used to accomplish this purpose. One type of tensioner uses a bushing formed of an elastomeric material which is placed in compression by some mechanical means for continuously exerting a tensioning force on the belt. Examples of these constructions are shown in U.S. Pat. Nos. 3,975,965 and 4,144,772. These tensioner constructions, which use an elastomeric material, have the disadvantages in that the high load rate which they exert on the belt results in the rapid loss of tensioning as the belt stretches, and this load rate limits the stroke of the belt-engaged idler pulley to a shorter distance than desired. Also, sudden acceleration and deceleration of the drive belt can cause a whipping action to occur which creates a time lag before full damping is achieved.

Numerous other types of belt tensioning devices use coil springs which are either in compression or tension, for applying and maintaining the tensioning force on a belt-engaging idler pulley or chain-engaging sprocket. Some examples of these types of constructions are shown in U.S. Pat. Nos. 2,703,019, 2,893,255, 3,413,866, 3,483,763, 3,631,734, 3,768,324, 3,812,733, 3,924,483, 3,965,768 and 4,108,013. Some of these various coil spring actuated devices use the biasing force of a spring in combination with hydraulic actuated members for regulating the amount of tensioning force applied to the belt, depending on whether the engine is running or shut off. Examples of these combination spring and hydraulic belt tensioners are shown in U.S. Pat. Nos. 2,051,488, 3,142,193 and 4,077,272.

There is no known belt tensioning device of which we are aware which imparts a nearly constant predetermined tensioning force on an endless accessory drive belt by an idler pulley by the use of a pair of cam plates which are biased into camming engagement by a plurality of spring discs in a simple and inexpensive arrangement and which maintains this nearly constant pressure on the belt whether the engine is on or off or operating at various speeds, and which reduces belt whip and achieves a highly efficient damping effect.

SUMMARY OF THE INVENTION

Objectives of the invention include providing an improved belt tensioner construction which is actuated by a plurality of spring discs, referred to in the trade as "Belleville springs," which exert a biasing force on a pair of cam plates to maintain a nearly constant predetermined tensioning force on the endless drive belt of the vehicle accessory drive system whether the engine is on or off or operating at various speeds and conditions; providing such a belt tensioner in which one of the cam plates is slidably mounted on a fixed shaft and is moved into camming engagement by the spring discs, with the other of the cam plates being rotatably mounted on the shaft and attached to a lever having an idler pulley mounted on its extended end, whereby the camming engagement of the plates rotates the lever in a belt tensioning direction with the idler pulley engaging the belt to tension the same; providing such a belt tensioner in which the spring discs are clamped between the slidable cam plate and a hub member with the hub member being axially adjustably mounted on the shaft, whereby the amount of biasing force exerted by the spring discs can be adjusted; providing such a belt tensioner in which each of the cam plates has an annular camming face, with each of the camming faces having a plurality of series of camming surfaces, each series being comprised of a flat base surface, a ramp surface and a flat upper surface, and in which the ramp surfaces of both plates are mutually engageable with each other to provide the camming action between the plates which rotates the lever to move the idler pulley into belt tensioning engagement; providing such a belt tensioner which is of an extremely rugged and inexpensive design and arrangement, which reduces maintenance and repair problems, which provides a relatively large amount of biasing force by use of the spring discs, and which provides an improved damping effect to the tensioner to prevent backlash or a whipping action from occurring; and providing such a belt tensioner which achieves the stated objectives in a simple, efficient and effective manner, and which solves problems and satisfies need existing in the art.

These objectives and advantages are obtained by the improved belt tensioner construction for tensioning an endless drive belt of the drive system for vehicle accessories, the general nature of which may be stated as including a shaft adapted to be mounted in a fixed position adjacent the drive belt; a lever rotatably mounted on the shaft and extending outwardly therefrom; an idler pulley mounted on the lever for tensioning engagement with the drive belt when moved in a belt tensioning direction; first cam means rotatably mounted on the shaft and operatively engaged with the lever for rotating said lever; second cam means slidably mounted on the shaft and engageable with the first cam means; and spring means biasing the second cam means into camming engagement with the first cam means to rotate said first cam means and the lever to move the idler pulley in a belt tensioning direction.

BRIEF DESCRIPTION OF THE DRAWINGS

A preferred embodiment of the invention—illustrative of the best mode in which applicants have contemplated applying the principles—is set forth in the following description and is shown in the accompanying drawings and is particularly and distinctly pointed out and set forth in the appended claims.

FIG. 1 is a diagrammatic view looking toward the front of an engine illustrating an endless drive belt operatively connected to and driving the vehicle accessories with the improved belt tensioner engaged therewith;

FIG. 2 is an end elevational view of the drive belt arrangement of FIG. 1 looking in the direction of arrows 2—2;

FIG. 3 is an enlarged sectional view taken on line 3—3, FIG. 1;

FIG. 4 is an elevational view looking in the direction of arrows 4—4, FIG. 3;

FIG. 5 is a sectional view taken on line 5—5, FIG. 3;

FIG. 6 is an enlarged plan view of the lever-mounted cam plate removed from the improved belt tensioner;

FIG. 7 is a right-hand end view of the cam plate shown in FIG. 6;

FIG. 8 is a diagrammatic view showing one series of the camming surfaces of the lever-mounted cam plate of FIGS. 6 and 7;

FIG. 9 is an enlarged plan view of the slidably mounted cam plate removed from the improved belt tensioner;

FIG. 10 is a right-hand end view of the cam plate shown in FIG. 9;

FIG. 11 is a diagrammatic view showing one series of the camming surfaces of the slidably mounted cam plate of FIGS. 9 and 10;

FIG. 12 is a diagrammatic view showing the camming engagement of the cam plates;

FIG. 13 is a plan view of a modified form of the lever-mounted cam plate removed from the improved belt tensioner, similar to the camming plate shown in FIG. 6;

FIG. 14 is a right-hand end view of the cam plate shown in FIG. 13;

FIG. 15 is a diagrammatic view showing one series of the camming surfaces of the lever-mounted cam plate of FIGS. 13 and 14;

FIG. 16 is a plan view of a modified slidably mounted cam plate removed from the improved belt tensioner, similar to the cam plate of FIG. 9, which is used in cooperation with the lever-mounted cam plate of FIG. 13;

FIG. 17 is a right-hand end view of the cam plate shown in FIG. 16; and

FIG. 18 is a diagrammatic view showing one series of the camming surfaces of the slidably mounted cam plate of FIGS. 16 and 17.

Similar numerals refer to similar parts throughout the drawings.

DESCRIPTION OF THE PREFERRED EMBODIMENT

Referring to FIG. 1 of the drawings, the improved belt tensioner construction is indicated generally at 1, and is shown in tensioning engagement with an endless drive belt 2 of a power transmission belt drive system which is shown diagrammatically looking toward the front of an engine. The accessory drive system consists of a plurality of belt pulleys or sheaves having configurations and diameters determined by and associated with engine accessory components and their locations relative to each other. The various pulleys are supported on their respective engine components which in turn are mounted on an engine 3 in a usual manner known in the art. Belt 2 preferably operates in a single vertical plane, as shown in FIG. 2, to eliminate binding and skewing of the belt.

The particular engine accessories drive system shown in FIG. 1 consists of a main driving pulley 4 which is operatively connected to the main drive shaft of the engine, a pulley 5 which is operatively connected to the engine air pump, a pulley 6 which is operatively connected to an alternator 7 which provides electrical power for the engine, a pulley 8 which is operatively connected to the vehicle power steering unit, and a pulley 9 which is operatively connected to the engine water pump.

The improved belt tensioner is shown particularly in FIGS. 3, 4 and 5 and includes as main components a shaft 12, a hub 13, a plurality of spring discs 14, an idler pulley 15, a lever 16, a lever-mounted cam plate 17 and a shaft-mounted cam plate 18.

Shaft 12 includes a main cylindrical-shaped tubular portion 20 terminating at one end in an annular flange 21 and at the other end in a threaded portion 22. Three axially extending slots or keyways 23 are formed in tubular portion 20 and extend from threaded end 22 approximately two-thirds the length of portion 20. Shaft 12 is formed with a central bore 24 through which a bolt 25 extends for mounting shaft 12 in a fixed position adjacent drive belt 2 on an engine mounting bracket 26. Shaft 12 is clamped tightly against bracket 26 by a nut 27 and a bolt head 28 which engages annular shaft flange 21 (FIG. 3). A small hole or recess 29 is formed in the end face of threaded end 22 of shaft 12 for receiving an alignment pin 30 therein which extends through a complementary-shaped hole 31 formed in mounting bracket 26 for positioning shaft 12 on bracket 26 and to prevent its rotation thereon.

Hub 13 has a generally annular-shaped configuration with a cylindrical portion 33 formed with an internally threaded bore 34 which is threadably engaged with threaded shaft end 22. Hub 13 further includes a radially outwardly extending flange portion 35 which is formed integrally with cylindrical portion 33 and which has a generally flat inner face 36 which abuttingly engages an endmost spring 14 (FIG. 3). A setscrew 37 extends through a complementary-shaped radially extending threaded hole 38 formed in cylindrical hub portion 33 for clamping engagement with threaded end 22 of shaft 12 to clamp hub 13 in an axially adjusted position on shaft 12.

Springs 14 are of a usual disc-shaped configuration, and are known in the art as "Belleville springs." Each spring 14 is formed with a central opening 40 through which shaft 12 extends for telescopically mounting springs 14 on cylindrical portion 20 of shaft 12. Four disc springs 14 are shown mounted on shaft 12 in the particular embodiment shown in FIG. 3 and are mounted in abutting relationship, whereby when they are compressed, they will exert an axial directional force. The number of springs 14 mounted on shaft 12 can vary without affecting the concept of the invention.

Pulley 15 is a usual sheet metal pulley having a belt-receiving peripheral groove 42 for receiving drive belt 2. Pulley 15 is rotatably mounted on lever 16 by a stub shaft 43, which is fixed to the extended end of lever 16 and preferably has a bearing (not shown) mounted on its extended end for rotatably mounting pulley 15 thereon.

Lever 16 preferably is formed of a lightweight aluminum stamping or casting and has an elongated, somewhat oval-shaped configuration (FIG. 4) with a central opening 45 being formed in the lower end thereof. Three equally spaced keyways 46 are formed about opening 45 in lever 16 for mounting the lever in a manner described below.

Cam plate 17, shown particularly in FIGS. 3, 6, 7 and 8, is of an integral one-piece construction having a cylindrical hub portion 49 and an annular-shaped camming ring portion indicated generally at 50. Camming portion 50 has a larger diameter than hub 49 and extends in a radially outwardly extending manner therefrom. Hub portion 49 has a smooth cylindrical bore 51 which is telescopically mounted on the outer end of shaft portion 20 and is rotatably mounted thereon by a bearing sleeve 52 (FIG. 3).

Hub bore 51 is formed with a shoulder 53, which is in abutting engagement with the inner end of bearing sleeve 52. The outer annular-shaped end face 54 of hub 49 is in abutting sliding engagement with a bearing washer 55 which is telescopically mounted on shaft 12 and located between hub end face 54 and the inner surface of shaft end flange 21 to provide a sliding engagement therebetween. Lever 16 is telescopically mounted on hub portion 49 of cam plate 17 by a press-fit or similar attachment means. Three equally circumferentially spaced keys 56 are formed integrally with hub porton 49 and are located in lever keyways 46 to provide a secure nonrotatable engagement between cam plate 17 and lever 16, whereby lever 16 and cam block 17 will rotate in unison for moving idler pulley 15 in a belt tensioning direction in a manner described in greater detail below.

In accordance with the invention, camming ring portion 50 of cam plate 17 is formed with an annular-shaped camming face having a plurality of series of camming surfaces formed thereon (FIG. 6). The particular camming surface arrangement shown in the drawings consists of four similar surface series. Each series has a flat radially extending base surface 58 which lies in the same plane with the inner annular-shaped end face 59 of hub portion 49, and a ramp surface 60 which extends upwardly from base surface 58 which terminates in a flat upper or outer surface 61 which is parallel with base surface 58. Ramp surfaces 60 extend upwardly at an angle of approximately 30° with respect to the plane of hub inner face 59 and bottom surface 58 and are integrally connected to surfaces 58 by relief surfaces 74 which extend perpendicularly from surfaces 58. Upper surfaces 61 are connected with bottom surfaces 58 by perpendicularly extending surfaces 62.

In the particular camming surface arrangement shown for cam plate 17, each base surface 58 has an arcuate length of 40°, each ramp surface 60 has an arcuate length of 26.6°, and each upper surface 61 has an arcuate length of 23.4°, thereby making each series of camming surfaces having a total arcuate length of 90° or one quadrant of the annular-shaped camming face of ring portion 50. Each series of these three camming surfaces is identical and repeats itself four times throughout the circumference of the camming face. These arcuate lengths and number of series may vary, if desired, without affecting the concept of the invention as shown in FIGS. 13–18.

Shaft-mounted cam plate 18, shown particularly in FIGS. 3, 9, 10 and 11, has a generally annular configuration formed with a central opening 65, having three radially inwardly projecting keys 66 formed thereon which are slidably engaged within keyways 23 formed in cylindrical shaft portion 20 to slidably, nonrotatably mount cam plate 18 thereon. This key-keyway engagement enables cam plate 18 to slide axially along shaft portion 20 while preventing any rotation therebetween.

Cam plate 18 has a generally flat annular-shaped outer end surface 67 which abuttingly engages the inner endmost spring disc 14 (FIG. 3). In accordance with the invention, the opposite end face of cam plate 18 is formed with an annular-shaped camming face which has a plurality of a series of camming surfaces, as does cam plate 17 described above. Each series of camming surfaces includes a flat base surface 68 which lies in the same plane as the annular inner face 69 of cam plate 18, and a ramp surface 70 which extends upwardly with respect to base surface 68 and terminates in a flat upper surface 71. Upper surfaces 71 are parallel with base surfaces 68. Ramps 70 do not extend directly upwardly from their respective base surfaces 68 as do ramps 60 of cam plate 17, but are connected to base surfaces 68 by upwardly extending surfaces 72. Ramps 70 extend upwardly at an angle of approximately 30° with respect to the plane of base surfaces 68. Base surfaces 68 are connected to upper surfaces 71 by vertically upwardly extending surfaces 73 which are generally parallel with opposite surfaces 72.

In the particular camming surface arrangement shown for cam plate 18, each base surface 68 has an arcuate length of 53.8°, each ramp surface 70 has an arcuate length of 6.2°, and each upper surface 71 has an arcuate length of 30°. Again, this arrangement makes each series of camming surfaces having a total arcuate length of 90° or one quadrant of the annular-shaped camming face, as do the camming surfaces of cam plate 17. Again, these arcuate lengths and number of series may vary, if desired.

The operation of improved belt tensioner 1 is described briefly below. The various components are telescopically mounted on shaft 12 in the arrangement shown in FIG. 3 with hub 13 being advanced axially along threaded end 22 toward lever 16, placing disc springs 14 in compression until a predetermined biasing force is exerted by the springs against hub 13 and cam plate 18. Hub 13 then is secured in its adjusted position by tightening of setscrew 37 against threaded end 22. The axial force exerted by springs 14 will slidably force cam plate 18 outwardly along shaft portion 20 and into camming engagement with cam plate 17. Cam plate 18 is prevented from rotational movement due to the engagement of its keys 66 in shaft keyway 23. Ramp surfaces 70 of cam plate 18 exert a rotational force component against ramp surfaces 60 of cam plate 17 rotationally urging cam plate 17 in a clockwise direction when viewing FIG. 1, since cam plate 17 is prevented from axial movement due to its abutment against shaft flange 21. This rotational movement or force exerted on cam plate 17 will rotationally urge lever 16 which is rigidly connected thereto in a belt tensioning direction forcing idler pulley 15 into tensioning engagement with belt 2.

Springs 14 will exert a predetermined linear axial biasing force or thrust on cam plate 18 which in turn is exerted proportionately into a rotational force on cam plate 17 due to the sliding engagement of ramp surfaces 60 and 70. As belt 2 stretches, cam plate 17 will be rotated in a further clockwise direction with ramps 70 moving farther upwardly along ramp 60, as shown in FIG. 12. Tensioner 1 has a cam operation range of approximately 30°, which is the arcuate distance that ramp surfaces 70 can move along ramp surfaces 60 to continually maintain a nearly constant tensioning force on belt 2 as the belt stretches. The amount of axial thrust exerted by spring discs 14 will decrease only a very small amount throughout this 30° rotational movement of lever 16 due to the spring characteristics which can be achieved by these spring discs in contrast to the heretofore-used coil springs.

Maintenance can be performed easily on any of the accessories driven by belt 2 or belt 2 can be replaced easily should it become broken or excessively worn by loosening mounting nut 27 and tensioning hub 13 in the event that lever 16 cannot be manually moved in a counterclockwise direction to release its tensioning force on belt 2.

Cam plates 17 and 18 may have various camming surface arrangements other than the particular series shown in FIGS. 8–12 and described above, without affecting the concept of the invention. A modified form of camming surface arrangement is shown in FIGS. 13–18. A lever-mounted cam plate is indicated generally at 75 (FIGS. 13–15), which is used in cooperation with a modified shaft-mounted cam plate 76 (FIGS. 16–18). Cam plates 75 and 76 have the same general configuration as cam plates 17 and 18 except for the particular series of camming surface arrangements.

Camming ring portion 77 of cam plate 75 is formed with an annular-shaped camming surface having a plurality of series of camming surfaces formed thereon (FIG. 13). The particular camming surface arrangement shown in the drawings consists of three similar surface series. Each series has a flat radially extending base surface 78 which lies in the same plane with the inner annular-shaped end face 79 of the base hub and a ramp surface 80 which extends upwardly from base surface 78 at an angle of 25° and terminates in a flat upper or outer surface 81 which is parallel with base surface 79. Ramp surfaces 80 are connected to base surfaces 78 by surfaces 82 which extend perpendicularly upwardly from surfaces 78. Upper surfaces 81 preferably have tapered edges 83 which are connected to base surfaces 78 by perpendicularly extending surfaces 89.

In the particular camming surface arrangement shown for modified cam plate 75, each base surface 78 has an arcuate length of 35°, each ramp surface 80 has an arcuate length of approximately 61.5°, and each upper surface 81 has an arcuate length of approximately 23.5°. Thus, these three surfaces make each series of camming surfaces have a total arcuate length of 120° or one-third of the annular-shaped camming face of ring portion 77. Each series of these three camming surfaces is identical and repeats itself three times throughout the circumference of the camming face.

Shaft-mounted camming plate 76 (FIGS. 16–18) has a generally annular configuration similar to that of cam plate 18 and is formed with an annular-shaped camming ring portion 84 which has a plurality of a series of camming surfaces, as does cam plate 75 described above. Each series of camming surfaces of cam plate 76 includes a flat base surface 85 which lies in the same plane as the annular inner face 86 of ring portion 84, a ramp surface 87 which terminates in a flat upper surface 88, and an upper surface 88 which is parallel with base surface 85. Ramp surfaces 87 are connected to base surfaces 85 by perpendicularly extending surfaces 90. Upper surfaces 88 terminate in tapered edges 91 which are connected to base surfaces 85 by perpendicularly extending surfaces 92.

In the particular camming surface arrangement shown for cam plate 76, each base surface 85 has an arcuate length of approximately 35°, each ramp surface 87 has an arcuate length of approximately 63.5° and each upper surface 88 has an arcuate length of approximately 21.5°. Again, this arrangement makes each series of camming surfaces have a total arcuate length of 120°, as do the camming surfaces of cam plate 75.

The operation and camming engagement of the various surfaces of modified cam plates 75 and 76 are similar to that described above for cam plates 17 and 18 and therefore are not repeated.

Accordingly, the improved belt tensioner construction is simplified, provides an effective, safe, inexpensive, and efficient device which achieves all the enumerated objectives, provides for eliminating difficulties encountered with prior tensioning devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown in or described.

Having now described the features, discoveries and principles of the invention, the manner in which the improved belt tensioning construction is constructed and used, the characteristics of the construction, and the advantageous, new and useful results obtained; the new and useful structures, devices, elements, arrangements, parts and combinations are set forth in the appended claims.

We claim:

1. An improved belt tensioner construction for tensioning an endless drive belt of the drive system for vehicle accessories, said construction including:
   (a) a shaft adapted to be mounted in a fixed position adjacent the drive belt;
   (b) a lever rotatably mounted on the shaft and extending outwardly therefrom and movable in a belt tensioning direction;
   (c) an idler pulley mounted on the lever for tensioning engagement with the drive belt when the lever is moved in the belt tensioning direction;
   (d) first cam means rotatably mounted on the shaft and operatively engaged with the lever for rotating said lever;
   (e) second cam means slidably mounted on the shaft and engageable with the first cam means; and
   (f) spring means biasing the second cam means into camming engagement with the first cam means to rotate said first cam means and the lever to move the idler pulley in a belt-tensioning direction.

2. The belt tensioner construction defined in claim 1 in which the spring means is a plurality of disc-shaped springs telescopically mounted on the shaft in an abutting relationship.

3. The belt tensioner construction defined in claim 1 in which a hub is mounted on the shaft and is spaced axially from the second cam means; in which the spring means is telescopically mounted on the shaft between the hub and second cam means; and in which the hub is adjustable axially on the shaft to adjust the biasing force exerted on the second cam means by the spring means.

4. The belt tensioner construction defined in claim 3 in which the hub has a threaded bore; and in which the shaft has a threaded end which is telescopically threadedly engaged in the hub bore to adjustably mount the hub on the shaft.

5. The belt tensioner construction defined in claim 4 in which alignment means is provided on the threaded end of the shaft for correctly positioning said shaft when mounted adjacent a drive belt on an engine mounting bracket.

6. The belt tensioner construction defined in claim 1 in which bearing means rotatably mount the lever and first cam means on the shaft.

7. The belt tensioner construction defined in claim 1 in which the first and second cam means are telescopically mounted on the shaft and have mutually engageable annular-shaped camming faces; in which each of the camming faces has a plurality of a series of surfaces; and in which each of said series of surfaces includes a base surface, an upwardly extending ramp surface and an upper surface.

8. The belt tensioner construction defined in claim 7 in which there are four series of camming surfaces on each of the cam means; and in which the arcuate length of each of the ramp surfaces of the first cam means is greater than the arcuate length of each of the ramp surfaces of the second cam means.

9. The belt tensioner construction defined in claim 8 in which the arcuate length of each of the ramp surfaces of the first cam means is approximately 27°, and the arcuate length of each of the ramp surfaces of the second cam means is approximately 6°.

10. The belt tensioner construction defined in claim 7 in which the base surface and upper surface of each series of camming surfaces are parallel to each other.

11. The belt tensioner construction defined in claim 7 in which each series of camming surfaces of both cam means has a total arcuate length of 90°.

12. The belt tensioner construction defined in claim 7 in which the approximate arcuate lengths of the base, ramp and upper surfaces of each series of the first cam means is 40°, 27° and 23°, respectively.

13. The belt tensioner construction defined in claim 12 in which the approximate arcuate lengths of the base, ramp and upper surfaces of each series of the second cam means is 54°, 6° and 30°, respectively.

14. The belt tensioner construction defined in claim 7 in which the ramp surfaces of the first and second cam means are directly connected to the upper surfaces and are connected to the base surfaces by generally vertically extending surfaces.

15. The belt tensioner construction defined in claim 7 in which there are three series of camming surfaces on each of the cam means; and in which the arcuate length of each of the ramp surfaces of the first and second cam means are approximately equal to each other.

16. The belt tensioner construction defined in claim 7 in which each series of camming surfaces of both cam means has a total arcuate length of 120°.

17. The belt tensioner construction defined in claim 7 in which the approximate arcuate lengths of the base, ramp and upper surfaces of each series of the first cam means are 35°, 61.5° and 23.5°, respectively.

18. The belt tensioner construction defined in claim 7 in which the approximate arcuate lengths of the base, ramp and upper surfaces of each series of the second cam means are 35°, 63.5° and 21.5°, respectively.

19. The belt tensioner construction defined in claim 1 in which the second cam means has an annular configuration formed with a central opening through which the shaft extends to telescopically mount said second cam means on the shaft; in which an axially extending keyway groove is formed in the shaft; and in which an inwardly projecting key is formed on the second cam means adjacent the central opening and is engageable with the shaft keyway groove to slidably mount the second cam means on the shaft and to prevent rotation between said second cam means and said shaft.

20. An improved belt tensioner construction for tensioning an endless drive belt of the drive system for vehicle accessories, said construction including:
    (a) shaft means adapted to be mounted in a fixed position adjacent the drive belt;
    (b) lever means movably mounted on the shaft means in a belt tensioning direction;
    (c) pulley means mounted on the lever means for tensioning engagement with the drive belt when the lever means is moved in the belt tensioning direction;
    (d) cam means mounted on the shaft means and operatively engaged with the lever means for rotating said lever means; and
    (e) spring disc means biasing the cam means into camming engagement with the lever means to rotate said lever means to move the idler pulley in a belt tensioning direction.

* * * * *